April 24, 1962  F. W. LUTZ  3,030,812
MEASURING DEVICE
Filed Aug. 8, 1958
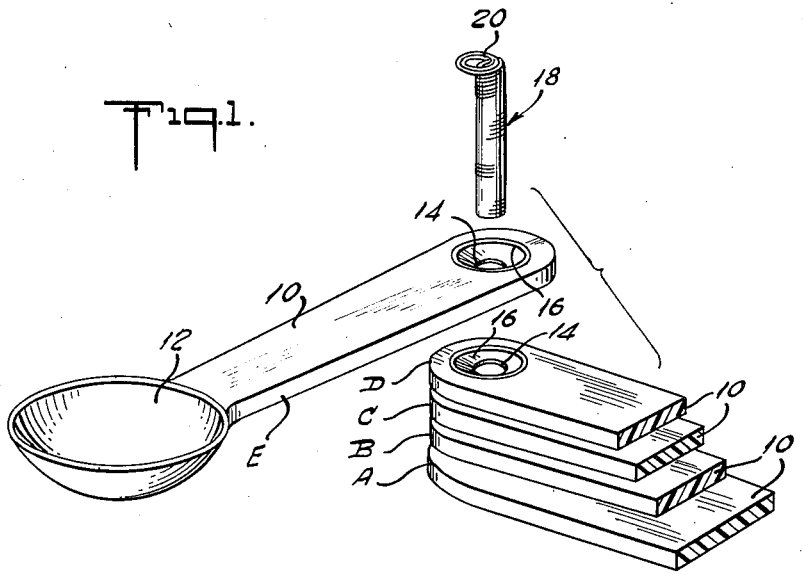
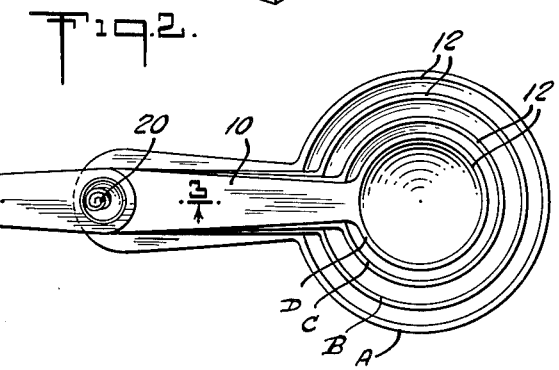
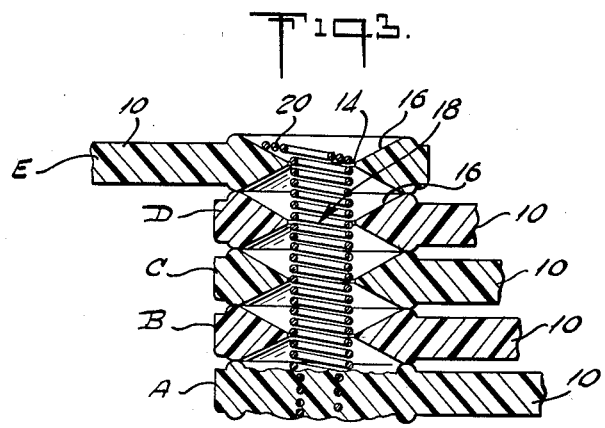
INVENTOR
FREDERICK W. LUTZ
BY
Moses, Nolte, & Nolte
ATTORNEYS United States Patent Office 3,030,812
Patented Apr. 24, 1962

3,030,812
MEASURING DEVICE
Frederick W. Lutz, Garden City, N.Y., assignor to Leetronics, Inc., Brooklyn, N.Y., a corporation of New York
Filed Aug. 8, 1958, Ser. No. 753,962
2 Claims. (Cl. 73—426)

This invention relates in general to measuring devices and particularly to a new and useful set of measuring spoons having a novel means for spring biasing and holding the set in nested fashion.

The present invention is particularly directed to an inexpensive device for securing the handles of a set of nested measuring spoons at a pivotal location at the end of the handles.

The present invention includes a spring which is inserted through a small diameter hole vertically aligned on each of the measuring spoon handles and which is secured under tension to the lowermost spoon as by applying a thermosetting plastic over the opening. The spring is held to the top spoon by a large diameter coil of the spring which is larger than the opening in the top spoon handle. The device permits individual biasing of the spoons out of their nested position and rotation away from the nest to permit individual use. The securing means is both simple and inexpensive and the assembly provides a spring biased nest of measuring spoons.

Accordingly, it is an object of this invention to provide improved means for holding a nest of measuring spoons under tension.

A further object of this invention is to provide a nest of measuring spoons held together in a nest by a coil spring extending through small openings at the end of the handles of each spoon and which is secured to the outermost spoon handles.

A further object of the invention is to provide a set of nested measuring spoons which is simple in design, rugged in construction and economical to manufacture.

The various features of novelty which characterize the invention are pointed out with particularity in the claims annexed and forming a part of this specification. For a better understanding of the invention, its operating advantages and specific objects obtained by its use, reference should be had to the accompanying drawings and descriptive matter in which there is illustrated and described a preferred embodiment of the invention.

In the drawings:

FIG. 1 is a fragmentary exploded perspective view of a plurality of nested spoons constructed in accordance with the invention;

FIG. 2 is a top plan view of the nested measuring spoons constructed in accordance with the invention and indicating one of the spoons of the nest rotated to an operating position; and FIG. 3 is a vertical section taken on the line 3—3 of FIG. 2.

Referring to the drawings in particular, the invention as embodied therein includes a plurality of measuring spoons generally designated A, B, C, D and E. Each of the spoons includes an elongated handle 10 and a semi-spherical measuring cup portion 12. The cup portions 12 are of gradually decreasing dimensions from the largest size measuring spoon A to the smallest size uppermost measuring spoon E so that they may nest one upon the other.

In accordance with the invention the handles 10 are made with a small diameter circular hole 14 and an intermediate frusto-conical portion 16 leading from the top surface of the handle to the hole 14. A spring generally designated 18 is inserted through each of the holes 14. The spring 18 includes a double wound coil portion 20 of greater diameter than the holes 14 which is held by the frusto-conical portion 16 of the top spoon E.

In accordance with the invention the coil spring 18 is sealed under tension to the lowermost spoon A preferably by heating the plastic in the vicinity of the lowermost opening 14 which is of smaller diameter than the other holes to cause the melted plastic to encase the coil spring and secure it to the walls of the handle A of the spoon upon subsequent hardening. The hole 14 in spoon A is made smaller than the others for this purpose. The spring 18 is thus securely positioned between the frusto-conical portion 16 of the top spoon E and the bottom portion of the spoon A. With this construction, each of the spoons may be lifted out of their nested position by tensioning the spring 18. In FIG. 2, spoon E is shown rotated to a position out of the nesting arrangement, permitting its individual use for measuring purposes.

Thus the invention provides not only a simple means for holding spoons in a nested position but includes means for biasing them in such position while permitting easy separation or removal from the nest. The device is extremely inexpensive and is very simple to manufacture and assemble.

While a specific embodiment of the invention has been shown and described in detail to illustrate the application of the invention principles, it will be understood that the invention may be embodied otherwise without departing from such principles.

I claim:
1. A nest of measuring spoons comprising a plurality of spoons each including an elongated handle and a cup shaped portion of varying size, said spoons being nested with the cup shaped portions positioned one in the other, the uppermost and each of the intermediate said spoons having an opening adjacent the end of said handles, and a coil spring including a coiled portion at one end of larger diameter than the opening in the uppermost handle and a substantially uniform diameter portion, said coiled portion of larger diameter overlying the uppermost handle adjacent the opening therein, said uniform diameter portion being positioned to extend through the openings in said uppermost and intermediate spoon handles, said coil spring being secured to the lowermost handle and tensioned between the uppermost and lowermost handles.

2. A nest of measuring spoons according to claim 1 wherein said spoons are of thermoplastic material and wherein the end of said spring opposite to the large diameter coiled portion is attached to the end spoon by plastic material heat fused to the material of the lowermost handle and bonded to said spring.

References Cited in the file of this patent
UNITED STATES PATENTS

| | | |
|---|---|---|
| 1,249,017 | Brunkhurst | Dec. 4, 1917 |
| 1,462,925 | Wilburger | July 24, 1923 |
| 1,755,141 | Woythal | Apr. 15, 1930 |
| 2,151,294 | Ellingsen | Mar. 21, 1939 |